United States Patent [19]
Morrissey

[11] Patent Number: 5,827,019
[45] Date of Patent: Oct. 27, 1998

[54] SELF-CALIBRATING COUNTERSINK TOOL

[75] Inventor: William J. Morrissey, Waterbury, Conn.

[73] Assignee: Century Tool & Design, Inc., Milldale, Conn.

[21] Appl. No.: 932,906

[22] Filed: Sep. 17, 1997

Related U.S. Application Data

[63] Continuation-in-part of Ser. No. 70,746, Apr. 8, 1997.

[51] Int. Cl.$^6$ ..................................................... B23B 51/00
[52] U.S. Cl. ........................... 408/227; 408/228; 408/231; 408/713
[58] Field of Search ................................... 408/227, 228, 408/231, 233, 713, 199

[56] References Cited

U.S. PATENT DOCUMENTS

| | | | |
|---|---|---|---|
| 3,400,616 | 9/1968 | Mihic | 408/713 |
| 3,861,010 | 1/1975 | Weinreich | 408/199 |
| 4,197,042 | 4/1980 | Krhounek et al. | 408/713 |
| 4,353,670 | 10/1982 | Jorgensen | 408/713 |
| 4,710,072 | 12/1987 | Heule | 408/227 |
| 4,799,834 | 1/1989 | Wells | 408/225 |
| 5,071,295 | 12/1991 | Greig | 408/233 |
| 5,259,707 | 11/1993 | Keller | 408/231 |
| 5,474,407 | 12/1995 | Rodel et al. | 408/227 |

*Primary Examiner*—Daniel W. Howell
*Assistant Examiner*—Adesh Bhargava
*Attorney, Agent, or Firm*—Alix, Yale & Ristas, LLP

[57] ABSTRACT

A self-calibrating countersink tool includes a reusable insert-holder with an axis-defining shank portion and an insert-receiving notch disposed at one end of the holder. The tool also includes at least one selectively attachable insert which is sized and shaped to be received within the insert-receiving notch of the holder. Each disposable insert includes a tapered cutting-edge portion and a notch-mating portion which is complementary in shape to the insert-receiving notch. When the insert is in mating engagement with the holder, the cutting-edge of the insert is disposed forwardly of the holder and defines an angle of between about 105 and 165 degrees relative to the holder axis. The countersink tool also includes an affixation means for affixing a disposable insert to the holder such that the insert is in mating engagement with the insert-receiving notch.

13 Claims, 2 Drawing Sheets

5,827,019

SELF-CALIBRATING COUNTERSINK TOOL

This application is a continuation-in-part application of Ser. No. 29/070,746 filed on Apr. 8, 1997.

BACKGROUND OF THE INVENTION

1. Field of the Invention

The present invention generally relates to the field of cutting tools. More particularly, the present invention is directed to an improved countersink tool for use in the machining arts. Accordingly, the general objects of the present invention are to provide novel and improved methods and apparatus of such character.

2. Description of the Related Art

Countersink tools have been widely used in the machining arts for many years. These related art countersink tools typically take the form of an integral countersink bit having an appropriate profile and being sized and shaped to be received within the chuck of an electrically driven machine such as a drill press or a lathe. These prior countersink bits are integrally formed from a single piece of hardened metal wherein the cutting-edge of the bit extends from one end of a generally cylindrical lower shank portion at an appropriate angle. Upon setup of the machine, i.e., prior to machining workpieces, the countersink bit must be placed in the chuck and the machine appropriately calibrated so that the bit will cut countersink cavities of the proper size, location, depth and shape into the workpieces during operation. Once this calibration procedure has been performed, the countersink bit will uniformly machine the workpieces until the bit has worn to the point where it is out of tolerance with the required specifications. Given the vast number of workpieces normally produced in the machining art, bit replacement is typically a frequent occurrence. For machining to continue at this point, the conventional countersink bit must be removed from the machine and replaced with a new one. However, since a new bit has been placed in the machine, the above-noted calibration procedure must be repeated. Additionally, the machine will also need to be calibrated upon replacement of the countersink bit with one of a different size. In this case as well, the need to recalibrate the machine is the natural result of employing a countersink bit having a cutting-edge integrally formed with the lower shank portion.

In order to reduce the frequency of machinery calibration, countersink bits of this nature are typically made of expensive high-quality metals. For example, the integrally-formed countersink bits discussed above are typically formed from a hardened carbide material. While this does reduce the frequency of recalibration, it also adds to the cost of the countersink bits themselves. Further, since these countersink bits are often used in high tolerance machining applications, it is often not feasible to repair such bits once they have worn, i.e., the high precision demanded of these countersink tools effectively precludes the use of countersink bits which have been resharpened after wear has occurred.

Additionally, because such bits are integrally formed of high-quality and high-cost carbide material, it is relatively expensive for a machine shop to stock a full complement of countersink bits having various cutting angles and sizes. This deficiency is further exacerbated by the need to stock an inventory of back-up countersink bits to replace the bits as they inevitably wear out.

Therefore, there remains a need in the art for an improved countersink tool which overcomes the aforementioned deficiencies of the related art by reducing the cost of each individual countersink bit and by reducing the total number of countersink bits which must be kept as inventory in machine shops.

Additionally, there remains a need in the art for an improved countersink tool which overcomes the aforementioned deficiencies of the related art by providing a non-integral countersink bit utilizing replaceable inserts.

There remains a further need in the art for an improved countersink tool which overcomes the aforementioned deficiencies of the prior art by providing a multi-component countersink tool kit which provides users with the ability to assemble a desired countersink bit from a reusable holder and a plurality of interchangeable inserts.

SUMMARY OF THE INVENTION

It is, accordingly, an object of the present invention to provide an improved countersink tool which is less expensive than conventional countersink bits both initially and over the field-life of the countersink bit.

It is another object of the present invention to provide an improved countersink tool which reduces the countersink bit inventory requirements of machine shops, thereby reducing costs for machinists.

It is yet another object of the present invention to provide a non-integral countersink tool which is capable of utilizing replaceable inserts.

It is still another object of the present invention to provide a countersink tool kit which includes a holder and a plurality of interchangeable inserts to provide users with the ability to assemble a desired countersink bit from a reusable holder and a plurality of interchangeable inserts.

It is still another object of the present invention to provide an improved countersink tool which provides an optimal combination of (1) simplicity; (2) reliability; (3) durability; (4) versatility; and (5) economy.

These and other objects of the present invention are provided in one embodiment by providing a self-calibrating countersink tool with interchangeable inserts. The tool includes a reusable insert-holder with an axis-defining shank portion and an insert-receiving notch disposed at one end of the holder. The insert-receiving notch is sized and shaped to individually receive a complementary disposable insert. Each disposable insert includes a tapered cutting-edge portion and a notch-mating portion which is complementary in shape to the insert-receiving notch. When the insert is in mating engagement with the holder, the cutting-edge of the insert is disposed forwardly of the holder and defines an angle θ of between about 105 and 165 degrees relative to the holder axis. The inventive countersink tool also includes a fixation means for affixing the disposable insert to the holder such that the insert is in mating engagement with the insert-receiving notch.

Other embodiments of the present invention include a multi-component countersink tool which includes a reusable holder, a plurality of inserts and means to affix one of the inserts to the insert-holder. Still other embodiments are directed to the individual components of the inventive countersink tool kit such as the holder and the inserts.

Relative to the countersink bits of the related art, the countersink tool of the present invention offers the advantage that the cutting-edge of the bit is disposed on an insert which is separable from the insert-holder. Since the insert and insert-holder are non-integral in the present invention, the worn inserts of the present invention can be replaced with fresh inserts of the same, or of a different, type without the need to recalibrate the machine with which the countersink bit is used. For example, after the machine has been calibrated, and the inventive countersink bit used to machine sufficient workpieces to cause significant wear to the insert, the user merely needs to release the affixation means, insert a fresh insert and then reactivate the affixation means to begin machining a new run of workpieces. The fresh insert will, thus, be self-calibrated to within one one-thousandths of an inch. Therefore, no further calibration is necessary.

The use of a separable insert and insert-holder also offers the advantage of significant cost reduction relative to the countersink bits of the related art. For example, since the inventive insert-holder itself experiences very little wear during use, it can be manufactured from low-cost materials without reducing the quality of the results achieved. Instead, the work quality remains high due to the use of high quality materials on the insert portion of the countersink tool. Thus, the countersink tool of the present invention can be made at a lower cost with no loss of machining quality and no reduction in the number of workpieces which can be machined before a given insert wears out.

Another significant advantage offered by the present invention is that inventory costs can be reduced. In particular, using the present invention, machinists no longer need to stock a surplus of expensive related art countersink bits. Rather, by using the present invention, machinists can utilize a single reusable holder and a supply of relatively inexpensive replaceable inserts. This supply of replaceable inserts can include inserts of various sizes for use with a single insert-holder thereby avoiding the need to stock a plurality of countersink bits of each size. This advantage is directly due to the ability of a single insert-holder to accept inserts of various sizes.

Still another advantage of the present invention resides in the fact that the insert-holders can alternatively accept both right and left-handed replaceable inserts. Accordingly, some embodiments of the present invention include both right and left-handed countersink bits to allow cutting on both the front and back end of a part ID. Again, this reduces inventory requirements as well as costs.

Numerous other advantages and features of the present invention will become apparent to those of ordinary skill in the art from the following detailed description of the invention, from the claims and from the accompanying drawings.

BRIEF DESCRIPTION OF THE DRAWINGS

The preferred embodiment of the present invention will be described below with reference to the accompanying Figures wherein like numerals represent like structures and wherein.

DESCRIPTION OF THE PREFERRED EMBODIMENT

Figure 1:
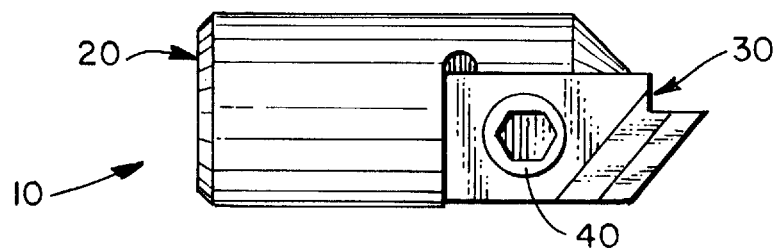
FIG. 1 is a top view of a countersink tool in accordance with the preferred embodiment of the present invention.
Figure 2:
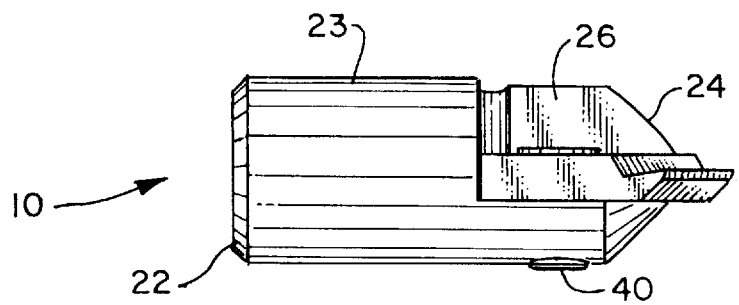
FIG. 2 is a front side view thereof.

The preferred embodiment of the countersink tool of the present invention will now be described with joint reference to FIGS. 1–7. As shown therein, a countersink tool 10 includes a reusable insert-holder 20, a replaceable insert 30 and a screw 40 for affixing insert 30 to holder 20. The countersink tool 10 is typically mounted to the chuck of a drill press, lathe or other manufacturing machine.

Holder 20 preferably includes a first end 22, a second end 24, a shank portion 23 disposed at the first end 22 and an insert-receiving notch 26 disposed at the second end 24. Shank portion 23 defines an axis A. Insert-receiving notch 26 includes a plurality of calibration surfaces 28 which function to precisely orient any complementary replacement insert received therein. The inserts may all be of identical type and size or may be of various sizes, shapes and types. For example, a single holder 20 which is 0.375 inches in diameter can accept inserts with cutting-edge angles θ of 120, 130, 135 or 139 degrees.

In order to ensure proper mating engagement between insert-receiving notch 26 and insert 30, threaded aperture 29 extends through first end 24 of holder 20 and functions to receive screw 40. Holder 20 is preferably formed of relatively low-cost metals such as 4140 Alloy Steel which can be heat treated. Since holder 20 never contacts workpieces during normal usage, the use of such low-cost materials does not result in degradation in performance of the inventive countersink tool.

Figure 4:
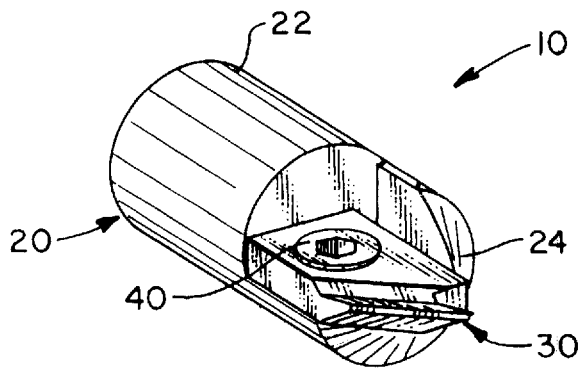
FIG. 4 is a perspective view thereof.
Figure 5:
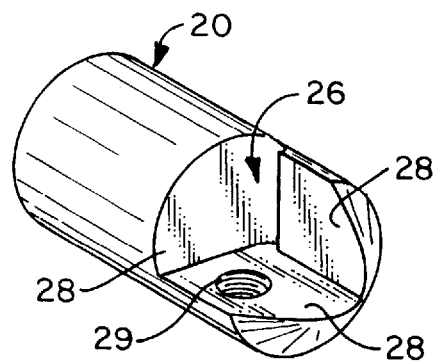
FIG. 5 is a perspective view of the insert-holder of FIGS. 1–4.
Figure 6:
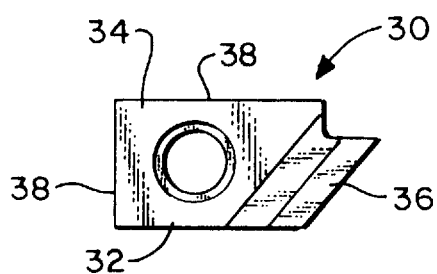
FIG. 6 is a top plan view of the replaceable insert of FIGS. 1–4.
Figure 7:
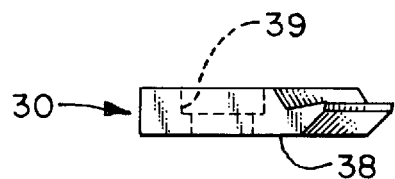
FIG. 7 is a side elevation view, partly in phantom, of the replaceable insert of FIGS. 1–4 and 6.

A replaceable insert 30 in accordance with the preferred embodiment of the present invention is depicted in FIGS. 6 and 7. As shown therein, insert 30 includes a body 32 and a cutting-edge portion 36. Body 32 includes a notch-mating portion 34, a plurality of reference (or calibration) surfaces 38 and a tapered screw-receiving aperture 39. Insert 30 is sized and shaped to be received within insert-receiving notch 26 of holder 20 such that mating engagement between insert 30 and notch 26 occurs when screw 40 passes through aperture 39 and is snugly received within aperture 29. Thus, screw 40, aperture 39 and aperture 29 cooperate to form an affixation means for fixedly attaching insert 30 onto holder 20. Screw 40 could either be an alien head screw, as shown in FIGS. 1 and 4, a torx head screw or equivalent.

Figure 3:
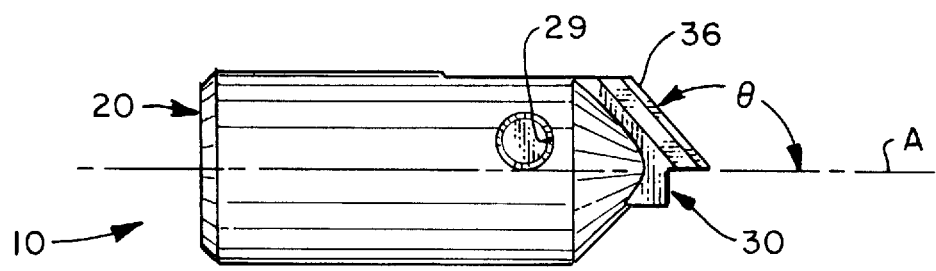
FIG. 3 is a bottom view thereof.

As shown in FIG. 3, the cutting-edge 36 of insert 30 defines an angle θ relative to axis A. While angle θ can be in the range between about 105 and 165 degrees, angle θ is preferably between about 120 and 135 degrees. Also as shown in FIG. 3, for example, when insert 30 is fixedly attached to holder 20, cutting-edge 36 extends forwardly of second end 24 of holder 20. Thus, as countersink tool 10 is rotated about axis A, such as occurs during normal usage, cutting-edge 36 of insert 30 is the only portion of countersink tool 10 which is in actual contact with the workpieces.

Insert 30 is preferably formed from a high quality carbide material. Alternatively, insert 30 could be formed from any one of a wide variety of materials known for their durability in such applications such as steel. Similarly, insert 30 could be treated by any one of a number of widely known processes to improve the hardness thereof such as by annealing.

A number of alternative features of the preferred embodiment are possible. For example, while insert 30 is depicted as a right-handed insert, i.e., in use countersink tool 10 is rotated clockwise to form the desired countersink cavity, insert 30 could also be formed as a left-handed insert. In this case, the left-handed insert would be affixed to holder 20 and countersink tool 10 would be rotated in a counterclockwise direction to form the desired countersink cavity. Among other things, this provides the ability to cut on the back side of a part ID. As a further alternative, reference surfaces 38 of insert 30 and calibrating surfaces 28 of holder 20 can assume any one of a wide variety of complementary configurations. Further, the affixation means, i.e., screw 40, aperture 29 and aperture 39, could be replaced with any one of a number of configurations well-known in the art provided that the alternative affixation means is capable of securely and selectively affixing insert 30 to holder 20.

While the present invention has been described in connection with what is presently considered to be the most practical and preferred embodiments, it is to be understood that the invention is not limited to the disclosed embodiment, but is intended to cover various modifications and equivalent arrangements included within the spirit and scope of the appended claims.

What is claimed is:

1. A countersink tool comprising:

a reusable insert-holder having opposing first and second ends, an axis-defining shank portion disposed at said first end, and an insert-receiving notch disposed at said second end and being capable of receiving a selectively attachable insert;

a selectively attachable insert having a tapered cutting-edge which terminates in an apex and a notch-mating portion which is complementary in shape to said insert-receiving notch so that when said insert is in mating engagement with said holder, said notch-mating portion of said insert mates with said insert-receiving notch of said holder whereby said cutting-edge of said insert is disposed forwardly of said second end of said holder and defines a pre-determined angle relative to said axis and said apex is disposed on said axis; and affixation means for affixing said insert to said holder such that said insert is in mating engagement with said holder.

2. The countersink tool of claim 1, wherein said shank portion of said holder is generally cylindrical and said second end of said holder has a generally conical portion.

3. The countersink tool of claim 1, wherein said insert has a right-handed cutting-edge.

4. The countersink tool of claim 1, wherein said insert has a left-handed cutting-edge.

5. The countersink tool of claim 1, wherein said affixation means includes a threaded aperture in said second end of said holder, a tapered aperture extending through said insert and aligned with said holder aperture when said insert is in mating engagement with said holder and a screw extending through said insert aperture and threading into said holder aperture.

6. The countersink tool of claim 5, wherein said screw is a torx head screw.

7. The countersink tool of claim 1 wherein the cutting edge of the insert defines an angle of between 105 and 165 degrees relative to said axis.

8. A self-calibrating countersink tool with interchangeable inserts comprising:

a reusable insert-holder having opposing first and second ends, an axis-defining shank portion disposed at said first end of said holder and an insert-receiving notch which is disposed at said second end of said holder and is capable of individually receiving disposable inserts;

interchangeable first and second disposable inserts each having a tapered cutting-edge portion which terminates in an apex and a notch-mating portion which is complementary in shape to said insert-receiving notch so that when said first insert is in mating engagement with said holder, said notch-mating portion of said first insert mates with said insert-receiving notch whereby said cutting-edge portion of said first insert is disposed forwardly of said second end of said holder and defines a predetermined angle relative to said axis and said apex of said first insert is disposed on said axis, and so that when said first insert is removed from said holder and said second insert is in mating engagement with said holder, said cutting-edge portion of said second insert is oriented substantially identically to said cutting-edge portion presented by said first insert when said first insert was in mating engagement with said holder, said apex of said second insert being disposed on said axis; and affixation means for affixing one of said first and second inserts to said holder such that said affixed insert is in mating engagement with said holder.

9. The countersink tool of claim 8, wherein said shank portion of said holder is generally cylindrical and said second end of said holder has a generally conical portion.

10. The countersink tool of claim 8, wherein said first insert has a right-handed cutting-edge.

11. The countersink tool of claim 8, wherein said first insert has a left-handed cutting-edge.

12. The countersink tool of claim 8, wherein said affixation means includes a threaded aperture in said second end of said holder, a tapered aperture extending through said first insert and aligned with said holder aperture when said first insert is in mating engagement with said holder, a tapered aperture extending through said second insert and aligned with said holder aperture when said second insert is in mating engagement with said holder and a screw extending through one of said first and second insert apertures and threading into said holder aperture.

13. The countersink tool of claim 8 wherein the cutting edge of the first insert defines an angle of between 105 and 165 degrees relative to the axis.

* * * * *